United States Patent
Park et al.

(10) Patent No.: US 11,683,127 B2
(45) Date of Patent: Jun. 20, 2023

(54) DOWNLINK CONTROL INFORMATION (DCI) PIGGYBACK ON SEMI PERSISTENT SCHEDULING (SPS) CHANNEL

(71) Applicant: QUALCOMM Incorporated, San Diego, CA (US)

(72) Inventors: Sungwoo Park, Seoul (KR); Wooseok Nam, San Diego, CA (US); Xiaoxia Zhang, San Diego, CA (US); Tao Luo, San Diego, CA (US); Srinivas Yerramalli, Hyderabad (IN); Arumugam Chendamarai Kannan, San Diego, CA (US); Zhifei Fan, San Diego, CA (US); Ahmed Abdelaziz Ibrahim Abdelaziz Zewail, San Diego, CA (US); Akula Reddy, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 17/115,550

(22) Filed: Dec. 8, 2020

(65) Prior Publication Data
US 2021/0184798 A1 Jun. 17, 2021

Related U.S. Application Data

(60) Provisional application No. 62/946,560, filed on Dec. 11, 2019.

(51) Int. Cl.
*H04L 1/1607* (2023.01)
*H04L 5/00* (2006.01)
(Continued)

(52) U.S. Cl.
CPC .......... *H04L 1/1664* (2013.01); *H04L 1/0003* (2013.01); *H04L 5/001* (2013.01); *H04L 5/0055* (2013.01); *H04W 72/23* (2023.01)

(58) Field of Classification Search
CPC ..... H04L 1/1664; H04L 1/0003; H04L 5/001; H04L 5/0055; H04L 1/1854;
(Continued)

(56) References Cited

U.S. PATENT DOCUMENTS

2015/0312071 A1* 10/2015 Chen ..................... H04L 1/0016
370/329
2016/0183244 A1* 6/2016 Papasakellariou ...... H04L 5/001
370/329

(Continued)

OTHER PUBLICATIONS

Ericsson: "Scheduling/HARQ Enhancements for NR URLLC", 3GPP Draft, R1-1911948, 3RD Generation Partnership Project (3GPP), Mobile Competence Centre, 650, Route Des Lucioles, F-06921 Sophia-Antipolis Cedex, France, vol. RAN WG1, No. Reno, Nevada, Nov. 18, 2019-Nov. 22, 2019 Nov. 9, 2019 (Nov. 9, 2019), XP051823129, 10 Pages, Retrieved from the Internet: URL:https://ftp.3gpp.org/tsg_ran/WG1_RL1/TSGR1_99/Docs/R1-1911948.zip R1-1911948 Scheduling HARQ Enhancements for NRURLLC.docx [retrieved on Nov. 9, 2019] pp. 4-5, 2.1.2 PDCCH issues pp. 6-7, 2.1.4 Processing of punctured POSCH.

(Continued)

*Primary Examiner* — Mang Hang Yeung
(74) *Attorney, Agent, or Firm* — Patterson + Sheridan, L.L.P.

(57) ABSTRACT

Certain aspects of the present disclosure provide techniques for communication of downlink control information (DCI) piggybacked on a physical downlink shared channel (PDSCH) configured using semi persistent scheduling (SPS). A method that may be performed by a user equipment (UE) includes receiving a message having a configuration
(Continued)

for semi persistent scheduling (SPS) of data channels, receiving an indication associated with at least one first downlink control information (DCI) for transmission in at least one of the data channels, and monitoring for the data channels in accordance with the configuration for SPS.

30 Claims, 9 Drawing Sheets

(51) Int. Cl.
    *H04L 1/00*           (2006.01)
    *H04W 72/23*        (2023.01)

(58) Field of Classification Search
    CPC ... H04L 5/0044; H04L 5/0091; H04L 1/0025; H04W 72/042; H04W 72/0453; H04W 72/1273
    USPC .......................................................... 370/329
    See application file for complete search history.

(56) References Cited

U.S. PATENT DOCUMENTS

| | | | | |
|---|---|---|---|---|
| 2017/0019237 | A1* | 1/2017 | Yang | H04L 5/14 |
| 2018/0124753 | A1* | 5/2018 | Sun | H04W 72/042 |
| 2018/0220423 | A1* | 8/2018 | Ly | H04W 72/0453 |
| 2019/0320469 | A1* | 10/2019 | Huang | H04W 72/14 |
| 2022/0007399 | A1* | 1/2022 | Rastegardoost | H04L 1/1819 |

OTHER PUBLICATIONS

Intel Corporation: "On Multi-TRP/Multi-Panel Transmission", 3GPP Draft, 3GPP TSG RAN WG1 Meeting #97, R1-1908653, 3RD Generation Partnership Project (3GPP), Mobile Competence Centre, 650, Route Des Lucioles, F-06921 Sophia-Antipolis Cedex, France vol. RAN WG1, No. Prague, CZ, Aug. 26, 2019-Aug. 30, 2019 Aug. 17, 2019 (Aug. 17, 2019), XP051765261, pp. 1-24, Retrieved from the Internet: URL:http://www.3gpp.org/ftp/tsg_ran/WG1_RL1/TSGR1_98/Docs/R1-1908653.zip [retrieved on Aug. 17, 2019] Passage "Alignment of PRG grid", paragraph [0002], pp. 6-9, 5.1 Separate HARQ-ACK feedbac.

International Search Report and Written Opinion—PCT/US2020/064075—ISA/EPO—dated Mar. 9, 2021.

Qualcomm: "E-mail Discussions on 2-Stage DCI for NR", 3GPP Draft, Tsg-Ran WG1 #88, R1-1702629 E-mail Discussions on 2-Stage DCI for NR, 3rd Generation Partnership Project (3GPP), Mobile Competence Centre, 650, Route Des Lucioles, F-06921, Sophia-Antipolis Cedex, France, vol. RAN WG1. No. Athens, Greece, Feb. 13, 2017-Feb. 17, 2017, Feb. 15, 2017, XP051222023, 12 Pages, Retrieved from the Internet: URL: http://www.3gpp.org/ftp/tsg_ran/WG1_RL1/TSGR1_88/Docs/ [retrieved on Feb. 15, 2017], Sections 1, 3, 4, Sections 2 and 4.1.

\* cited by examiner

DOWNLINK CONTROL INFORMATION (DCI) PIGGYBACK ON SEMI PERSISTENT SCHEDULING (SPS) CHANNEL

CROSS-REFERENCE TO RELATED APPLICATION

This application claims benefit of and priority to U.S. Provisional Application No. 62/946,560, filed on Dec. 11, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for control signaling.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved techniques for control signaling.

Certain aspects are directed to a method for wireless communication. The method generally includes receiving a message having a configuration for semi persistent scheduling (SPS) of data channels, receiving an indication associated with at least one first downlink control information (DCI) for transmission in at least one of the data channels, and monitoring for the data channels in accordance with the configuration for SPS.

Certain aspects are directed to a method for wireless communication. The method generally transmitting a message having a configuration for SPS of data channels, transmitting an indication associated with at least one first DCI for transmission in at least one of the data channels, generating the at least one of the data channels in accordance with the configuration for SPS, and transmitting the at least one of the data channels.

Certain aspects are directed to an apparatus for wireless communication. The apparatus generally includes a memory, and at least one processor coupled to the memory, the at least one processor and the memory being configured to receive a message having a configuration for SPS of data channels, receive an indication associated with at least one first DCI for transmission in at least one of the data channels, and monitor for the data channels in accordance with the configuration for SPS.

Certain aspects are directed to an apparatus for wireless communication. The apparatus generally includes a memory, and at least one processor coupled to the memory, the at least one processor and the memory being configured to transmit a message having a configuration for SPS of data channels, transmit an indication associated with at least one first DCI for transmission in at least one of the data channels, generating the at least one of the data channels in accordance with the configuration for SPS, and transmit the at least one of the data channels.

Certain aspects are directed to an apparatus for wireless communication. The apparatus generally includes means for receiving a message having a configuration for SPS of data channels, means for receiving an indication associated with at least one first DCI for transmission in at least one of the data channels, and means for monitoring for the data channels in accordance with the configuration for SPS.

Certain aspects are directed to a method for wireless communication. The method generally means for transmitting a message having a configuration for SPS of data channels, means for transmitting an indication associated with at least one first DCI for transmission in at least one of the data channels, means for generating the at least one of the data channels in accordance with the configuration for SPS, and means for transmitting the at least one of the data channels.

Certain aspects are directed to a computer-readable medium having instructions stored thereon for receiving a message having a configuration for SPS of data channels, receiving an indication associated with at least one first DCI for transmission in at least one of the data channels, and monitoring for the data channels in accordance with the configuration for SPS.

Certain aspects are directed to a computer-readable medium having instructions stored thereon for transmitting a message having a configuration for SPS of data channels, transmitting an indication associated with at least one first DCI for transmission in at least one of the data channels, generating the at least one of the data channels in accordance with the configuration for SPS, and transmitting the at least one of the data channels.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
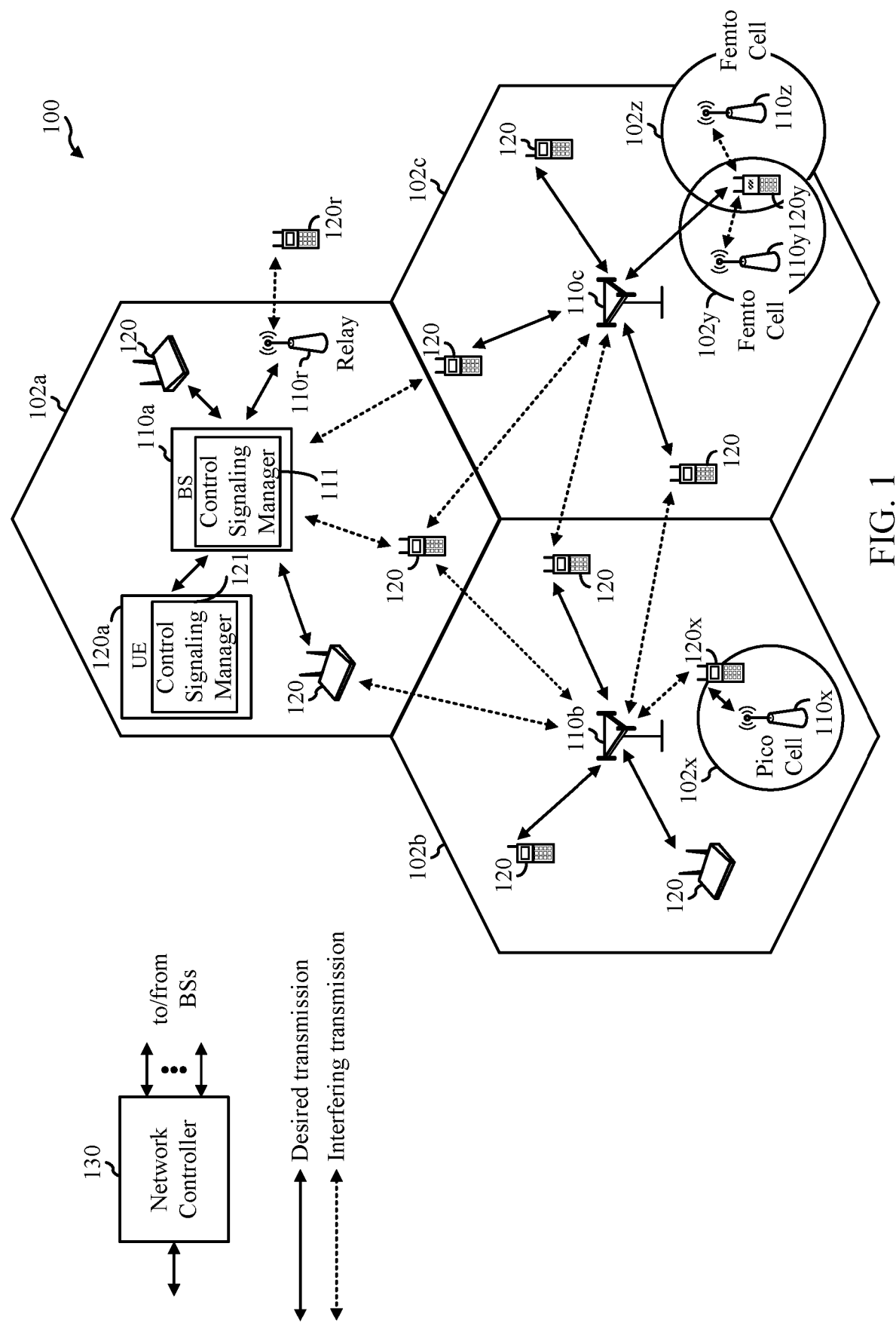
FIG. 1 is a block diagram conceptually illustrating an example telecommunications system, in accordance with certain aspects of the present disclosure.

Certain aspects of the present disclosure provide apparatus, methods, processing systems, and computer readable mediums for control signaling. For example, downlink control information (DCI) (also referred to as a piggybacked DCI) may be transmitted using (e.g., piggybacked on) resources of a data channel (e.g., physical downlink shared channel (PDSCH)) that is configured using semi persistent scheduling (SPS) (also referred to as SPS PDSCH). Using an SPS configured data channel to transmit DCI improves communication robustness.

In certain aspects, the DCI in the data channel may allocate resources for reception of another data channel, other DCI in the data channel, or open up monitoring of a control channel (e.g., physical downlink control channel (PDCCH)) occasion, as described in more detail herein. In one or more examples, the techniques described herein may be applicable to carrier aggregation (CA). For example, the piggybacked DCIs may be transmitted on a component carrier (CC) and allocate resources for transmission of signaling (e.g., PDSCH) on a different CC.

The following description provides examples of control signaling in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for transmission of downlink control information (DCI) that are piggybacked on semi persistent scheduling (SPS) PDSCH. As shown in FIG. 1, the BS 110a includes a control signaling manager 111. The control signaling manager 111 may be configured to transmit DCI using resources in SPS PDSCH, in accordance with aspects of the present disclosure. As shown in FIG. 1, the UE 120a includes a control signaling manager 121. The control signaling manager 121 may be configured to receive DCI that are piggybacked on SPS PDSCH, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
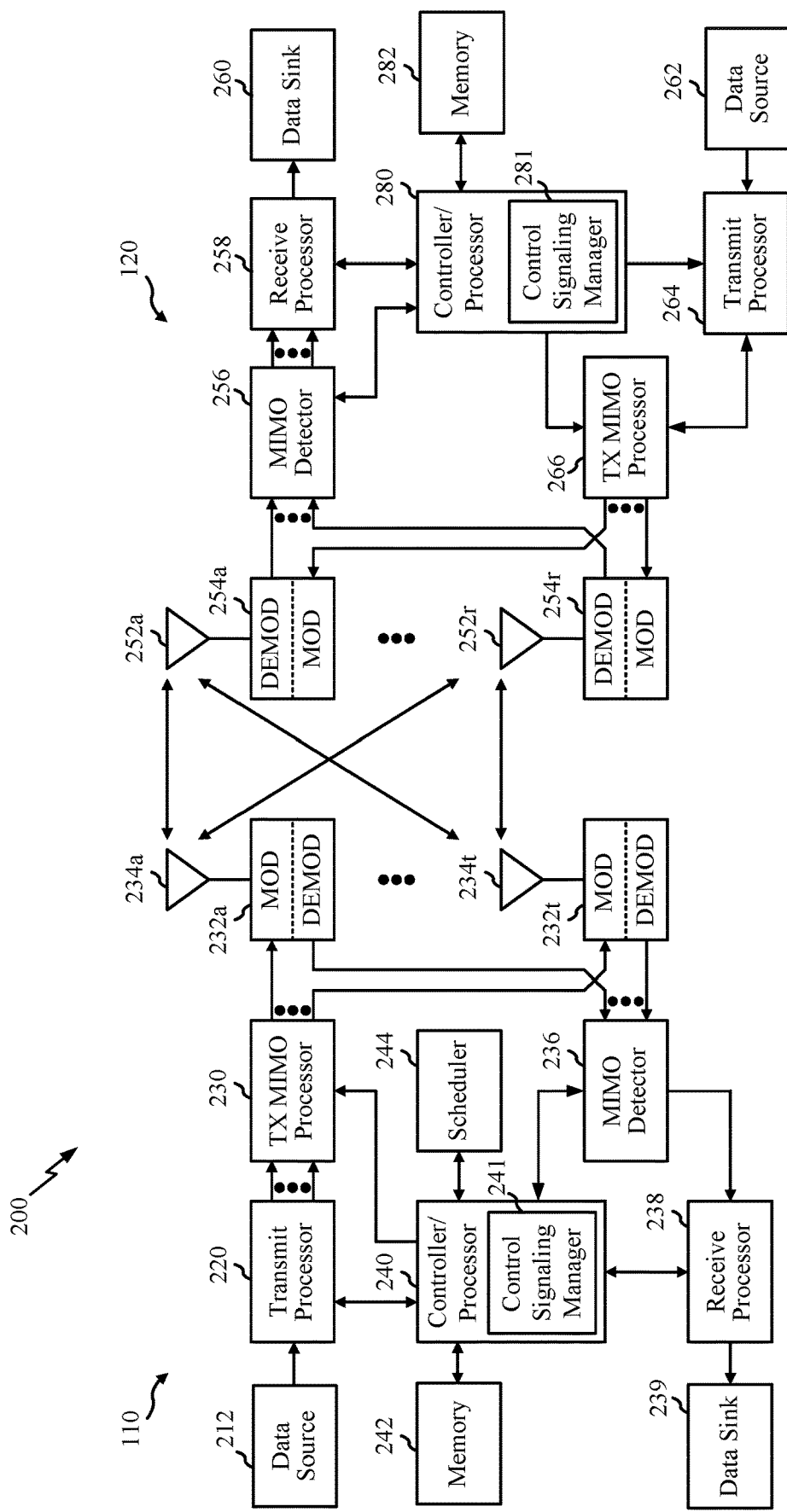
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), PDCCH, group common PDCCH (GC PDCCH), etc. The data may be for the PDSCH, etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a has a control signaling manager 241 that may be configured for transmitting DCI using resources on SPS PDSCH, according to aspects described herein. As shown in FIG. 2, the controller/processor 280 of the UE 120a has a control signaling manager 241 that may be configured for reception of DCI using resources on SPS PDSCH, according to aspects described herein. Although shown at the Controller/Processor, other components of the UE 120a and BS 110a may be used performing the operations described herein.

In some implementations, communication efficiency may be increased using beamforming. When beamforming is implemented, an array of antennas may be steered to transmit radio signals in a specific direction. The antenna arrays that use beamforming send/receive a relatively strong beam of signals in a specific direction. To implement beamforming, each antenna element may be provided a separate signal to be transmitted. The phase and amplitude of each signal may be controlled such that the transmitted signals by the antenna elements are added constructively and destructively so that they concentrate the signal into a narrow beam or lobe.

Example Techniques for Transmission of DCI Piggybacked on SPS PDSCH

In certain implementations, downlink control information (DCI) may be communicated on a physical downlink shared channel (PDSCH) (also referred to as a data channel). Higher communication bands, such as a 60 GHz band, may have relatively shorter slot durations as compared to lower bands, such as frequency range (FR) 1 and FR2, for example, due to the higher subcarrier spacing (SCS) (e.g., 960 kHz, 1.92 MHz, 3.84 MHz) associated with the higher bands. Thus, the number of physical downlink control channel (PDCCH) monitoring occasions may increase, leading to high power consumption. Due to the short slot duration and narrow analog beamforming transmission on higher bands, the chance of sending multiple DCIs to different UEs is reduced as compared to FR1/FR2. Instead, it may be more likely for a BS (e.g., gNB) to send multiple DCIs to the same UE (e.g., in particular for "bursty" traffic). Thus, DCI may be transmitted on a data channel in order to reduce control channel monitoring density for a better micro sleep schedule at the UE, reducing power consumption.

In some cases, a DCI in a control resource set (CORESET) (referred to as $DCI_{CORESET}$) may be transmitted in a frame along with one or more DCIs in PDSCHs (referred to as $DCI_{PDSCH}$'s) assigned by the $DCI_{CORESET}$. In other words, the $DCI_{CORESET}$ may include allocation information for the $DCI_{PDSCH}$, and in some cases, further include common parts of the multiple $DCI_{PDSCH}$. In some implementations, the $DCI_{CORESET}$ may indicate a regular grant (e.g., of another PDSCH). Moreover, each of the one or more $DCI_{PDSCH}$ may indicate a regular grant (e.g., of another PDSCH).

In some cases, the UE may implement intermittent PDCCH monitoring. In other words, the UE may only monitor PDCCH in a portion of slots in a frame, reducing power conversion at the UE. In one or more examples, PDCCH may be sent with a wider or the same size beam as compared to a PDSCH, resulting in low beamforming gain. Moreover, the PDCCH density in a CORESET may be high, resulting in high complexity for UE blind decoding. As described herein, a DCI in the PDCCH may indicate the resources for reception of one or more DCI (also referred to as piggybacked DCI) in a PDSCH. If the first DCI (e.g., $DCI_{CORESET}$) in the PDCCH is not detected by the UE, the UE may be unable to decode all the corresponding piggybacked DCIs ($DCI_{PDSCH}$).

In certain aspects of the present disclosure, one or more DCIs in a PDSCH configured using semi persistent scheduling (SPS) may be transmitted to increase communication robustness. For example, a PDSCH may be configured (e.g., via radio resource control (RRC) signaling) and activated by SPS, and may be used to communicate DCI for allocation of resources in other channels. Once the SPS is activated successfully (e.g., via DCI in a control channel), the UE may decode the PDSCH including one or more $DCI_{PDSCH}$, increasing communication robustness.

Figure 3:
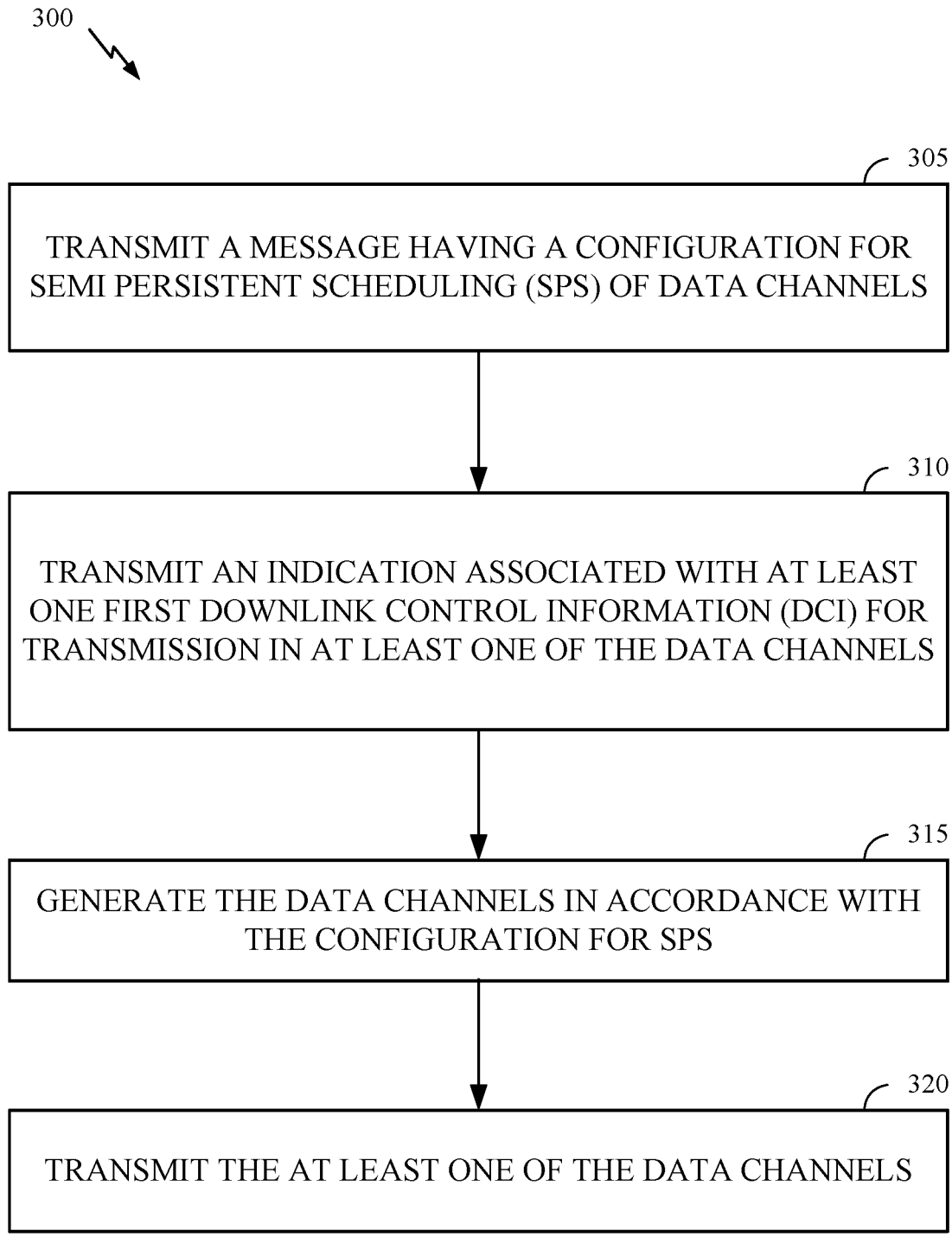
FIG. 3 is a flow diagram illustrating example operations for wireless communication by a BS, in accordance with certain aspects of the present disclosure.

FIG. 3 is a flow diagram illustrating example operations 300 for wireless communication, in accordance with certain aspects of the present disclosure. The operations 300 may be performed, for example, by a BS (e.g., such as the BS 110a in the wireless communication network 100).

Operations 300 may be implemented as software components that are executed and run on one or more processors (e.g., controller/processor 240 of FIG. 2). Further, the transmission and reception of signals by the BS in operations 300 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 300 may begin, at block 305, by transmitting a message (e.g., RRC message) having a configuration for semi persistent scheduling (SPS) of data channels (e.g., PDSCHs). At block 310, the BS may transmit an indication associated with at least one first DCI for transmission in at least one of the data channels. In certain aspects, the configuration associated with the at least one first DCI may be part of the message having the configuration for SPS of the data channels.

In certain aspects, the BS may transmit second DCI on a control channel, the second DCI activating the configuration for the SPS of the data channels. In some implementations, the second DCI, the message, or a combination thereof, may indicate the configuration associated with the at least one first DCI. At block 315, the BS may generate the data channels in accordance with the configuration for SPS, and at block 320, transmit the at least one of the data channels. In certain aspects, the at least one of the data channels (e.g., SPS PDSCH) may include the at least one first DCI, and the at least one first DCI may indicate resources allocated for at least one other data channel (e.g., PDSCH). The BS may transmit the at least one other data channel via the resources indicated by the at least one first DCI.

Figure 4:
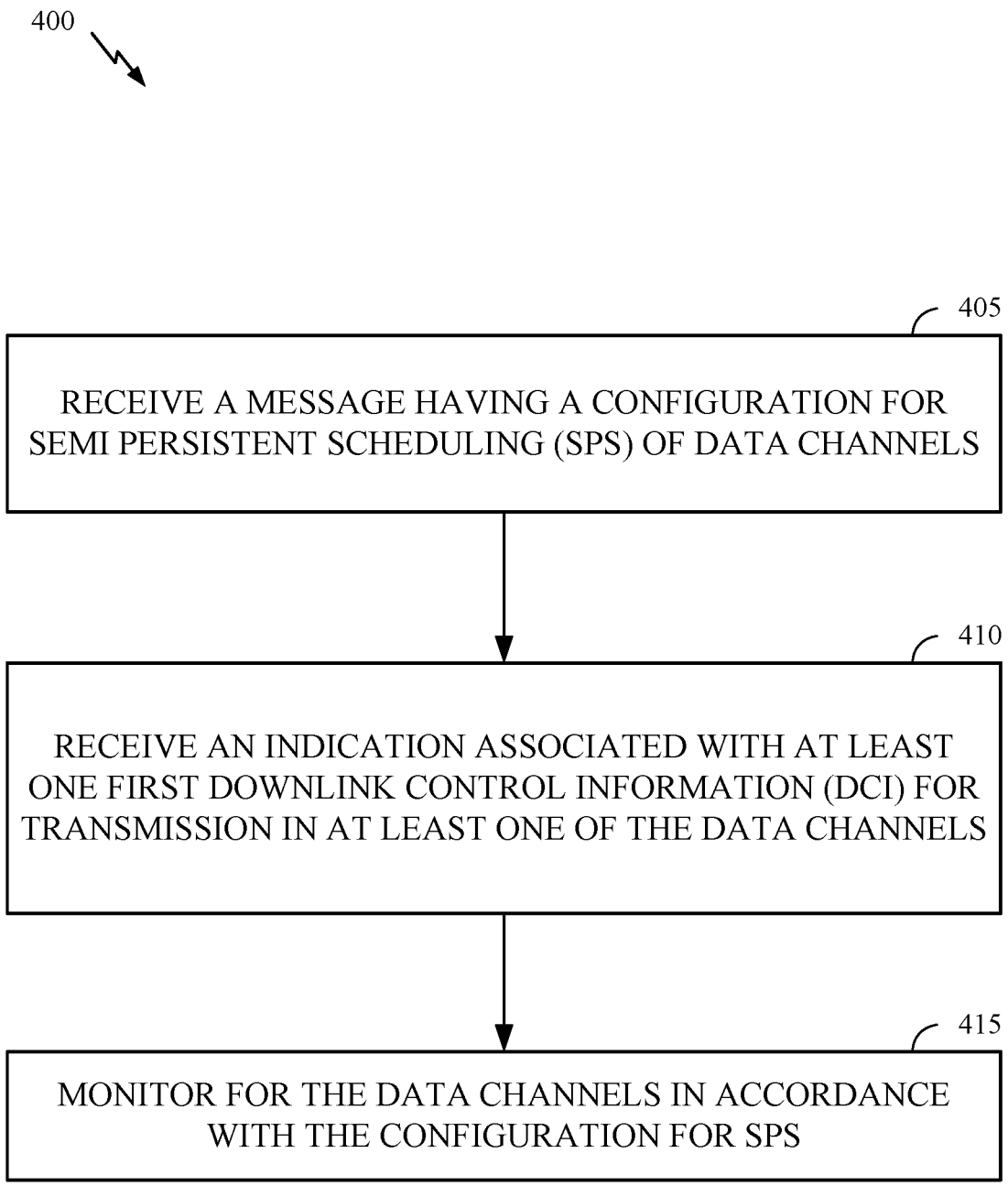
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed, for example, by UE (e.g., such as a UE 120a in the wireless communication network 100).

Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at block 405, by receiving a message (e.g., RRC message) having a configuration for semi-persistent scheduling (SPS) of data channels (e.g., PDSCH, also referred to as SPS PDSCH). In certain aspects, the UE may also receive second DCI on a control channel, the second DCI activating the configuration for the SPS of the data channels. At block 410, the UE may receive an indication associated with at least one first DCI (also referred to as a piggybacked DCI) for transmission in at least one of the data channels. In certain aspects, the configuration associated with the at least one first DCI may be part of the message having the configuration for SPS of the data channels.

In certain aspects, the UE may receive second DCI on a control channel, the second DCI activating the configuration for the SPS of the data channels. In some cases, the second DCI, the message, or a combination thereof, indicates the configuration associated with the at least one first DCI. At block 415, the UE may monitor for the data channels in accordance with the configuration for SPS. In certain aspects, the UE may receive the at least one of the data channels (e.g., SPS PDSCH) having the at least one first DCI. The at least one first DCI may indicate resources allocated for at least one other data channel (e.g., PDSCH). The UE may receive the at least one other data channel via the resources indicated by the at least one first DCI.

Figure 5A:
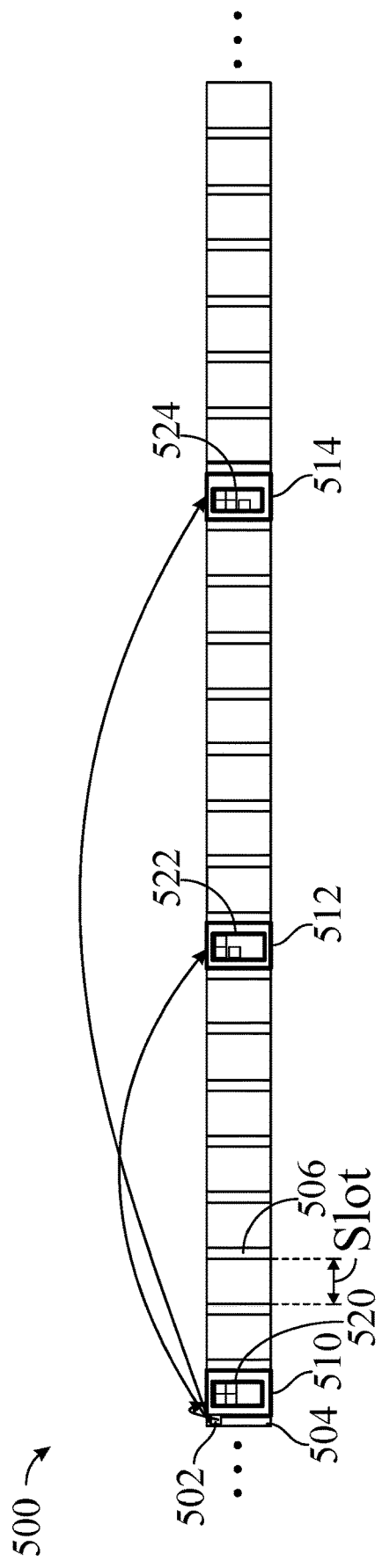
FIGS. 5A and 5B illustrates a frame including piggybacked downlink control information (DCI) in semi persistent scheduling (SPS) configured a physical downlink shared channel (PDSCH), in accordance with certain aspects of the present disclosure.
Figure 5B:
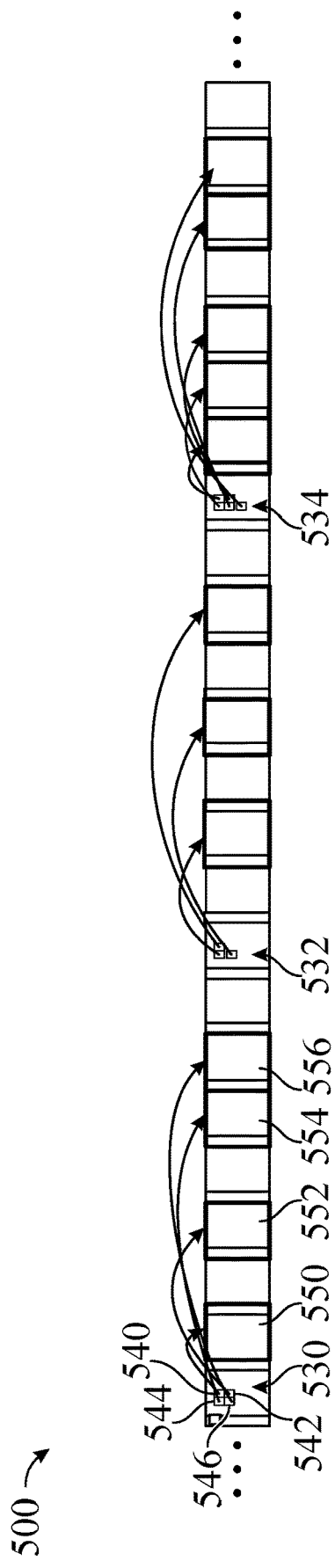

FIGS. 5A and 5B each illustrate a frame 500 including piggybacked DCI in SPS configured PDSCHs (also referred to as SPS PDSCH), in accordance with certain aspects of the present disclosure. As illustrated, the frame 500 may include multiple slots, each slot having a PDCCH monitoring occasion (e.g., PDCCH monitoring occasion 506). The UE may monitor a PDCCH 504 to receive a DCI 502. As illustrated, the UE may skip monitoring the PDCCH monitoring occasion in various slots, such as the PDCCH monitoring occasion 506. The DCI 502 may activate configured SPS PDSCHs 510, 512, 514. Each of the SPS PDSCHs 510, 512, 514 may include one or more piggybacked DCIs (e.g., DCI transmitted on an SPS PDSCH). For example, each of the PDSCHs 510, 512, 514 may be configured with resources 520, 522, 524 in which the piggybacked DCIs may be transmitted.

As illustrated in FIG. 5B, the resources 520 may include piggybacked DCIs 530, the resources 522 may include piggybacked DCIs 532, and the resources 524 may include piggybacked DCIs 534. In certain implementations, each of the piggybacked DCIs may schedule resources for reception of a PDSCH by the UE. For example, the DCI 540 may schedule resources for the PDSCH 550, the DCI 542 may schedule resources for the PDSCH 552, the DCI 544 may schedule resources for the PDSCH 554, and the DCI 546 may schedule resources for the PDSCH 556.

In some cases, SPS data may already exist for transmission in a PDSCH in which piggybacked DCIs are to be transmitted. In other words, the SPS may be configured via RRC signaling, and the SPS PDSCH may be configured for a specific type of data (e.g., also referred to as SPS data), such as voice data. The piggybacked DCIs may be sent concurrently with the SPS data in the SPS PDSCH.

In certain aspects, the information (e.g., configuration) of the piggyback DCI assignment (e.g., resource allocation, quantity of the piggyback DCIs, modulation and coding scheme (MCS), etc.) may be included in an SPS-configuration RRC message, an SPS-activation DCI (e.g., DCI 502), or a combination of both (e.g., some of the information may be in the RRC message and others may be in DCI). For example, a table composed of several candidates (also referred to as configuration candidates) for the piggyback DCI region (e.g., for different size and length) may be included in the SPS-configuration RRC message. The information of the piggyback DCI region may be indicated by the table index in the activation DCI. In other words, multiple candidate configurations may be indicated in the RRC message for the piggybacked DCIs, and the activation DCI (e.g., DCI 502) in the PDCCH may select one of the candidate configurations by indicating an index associated with the configuration.

In certain aspects, the SPS-configuration RRC message may configure one region for the piggyback DCIs in the SPS PDSCH. Whether the piggyback DCI(s) is sent in the region may be indicated by the SPS-activation DCI (e.g., DCI 502).

In certain aspects, the size of the piggyback DCI region (e.g., resources 520) indicated by configuration or activation may denote the maximum value. The actual size of the assigned piggyback DCI region (e.g., size of resources consumed by DCIs 540, 542, 544, 546) may vary over time and be different from the values indicated by RRC or DCI. In certain aspects, zero-padding may be used to fill in the remaining portions of the resources (e.g., resources 520) that are not being used for the piggybacked DCIs (e.g., DCIs 540, 542, 544, 546). In certain aspects, rate-matching and transport block size (TBS) calculation of SPS data in the PDSCH (e.g., PDSCH 510) may be based on the maximum size indicated by RRC or DCI.

In some cases, SPS data may not exist in the PDSCH (e.g., PDSCH 510) in which the piggybacked DCIs are transmitted. In this case, only the piggybacked DCIs may be sent in the SPS PDSCH (e.g., without downlink (DL)-shared channel (DL-SCH)). In this case, the RRC message or the DCI (e.g., DCI 502) may indicate whether only DCIs are included without the DL-SCH in the PDSCH or not. It may also be possible to allocate any type of data in the PDSCH assigned by SPS (i.e., send data concurrently with the DCIs). In other words, other type of data that is different that the SPS data (e.g., voice data) may be sent in the PDSCH (e.g., PDSCH 510).

In certain aspects, a single (or a small fixed number N) DCI may be assigned in the SPS PDSCH. The assigned DCI may be used to open a PDCCH monitoring occasion, or indicate resources to which one or more piggybacked DCIs are allocated, as described in more detail herein. If only one (or a small fixed number N) DCI is assigned in the SPS PDSCH, the TBS calculation of data in the PDSCH may be performed efficiently (e.g., reduce the waste of resources).

Figure 6:
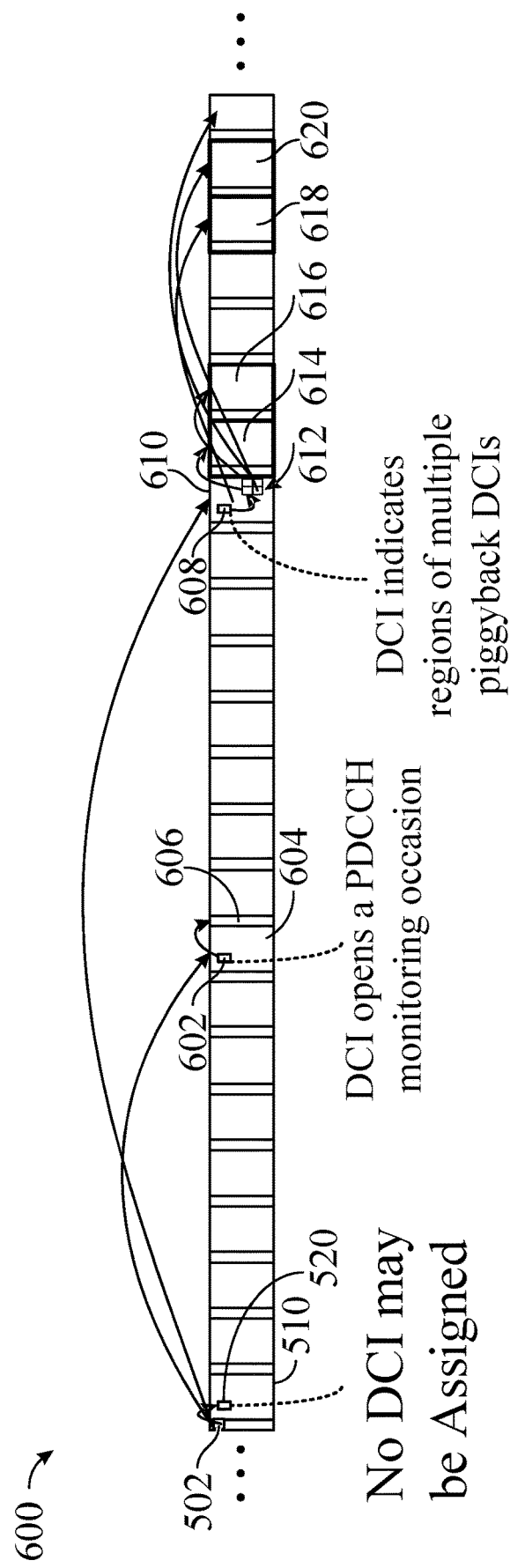
FIG. 6 illustrates a frame having a single DCI in an SPS PDSCH, in accordance with certain aspects of the present disclosure.

FIG. 6 illustrates a frame 600 having a single DCI in an SPS PDSCH, in accordance with certain aspects of the present disclosure. For example, the DCI 502 may activate the SPS PDSCH 510 having resources 520. However, no DCI may be assigned to the resources 520. In some cases, a DCI (e.g., DCI 602) may be assigned in resources of a SPS PDSCH (e.g., PDSCH 604). The DCI 602 may open up a PDCCH monitoring occasion that would otherwise not be monitored by the UE. In other words, the DCI 602 may indicate to the UE to monitor PDCCH 606. In certain aspects, a DCI (e.g., DCI 608) may be assigned in resources of a SPS PDSCH (e.g., PDSCH 610). The DCI 608 may indicate resources in the PDSCH 610 to which multiple piggyback DCIs 612 are allocated, and which are to be monitored by the UE. Each of the piggyback DCIs 612 may allocate resources for a PDSCH 614, 616, 618, 620, as illustrated.

Figure 7:
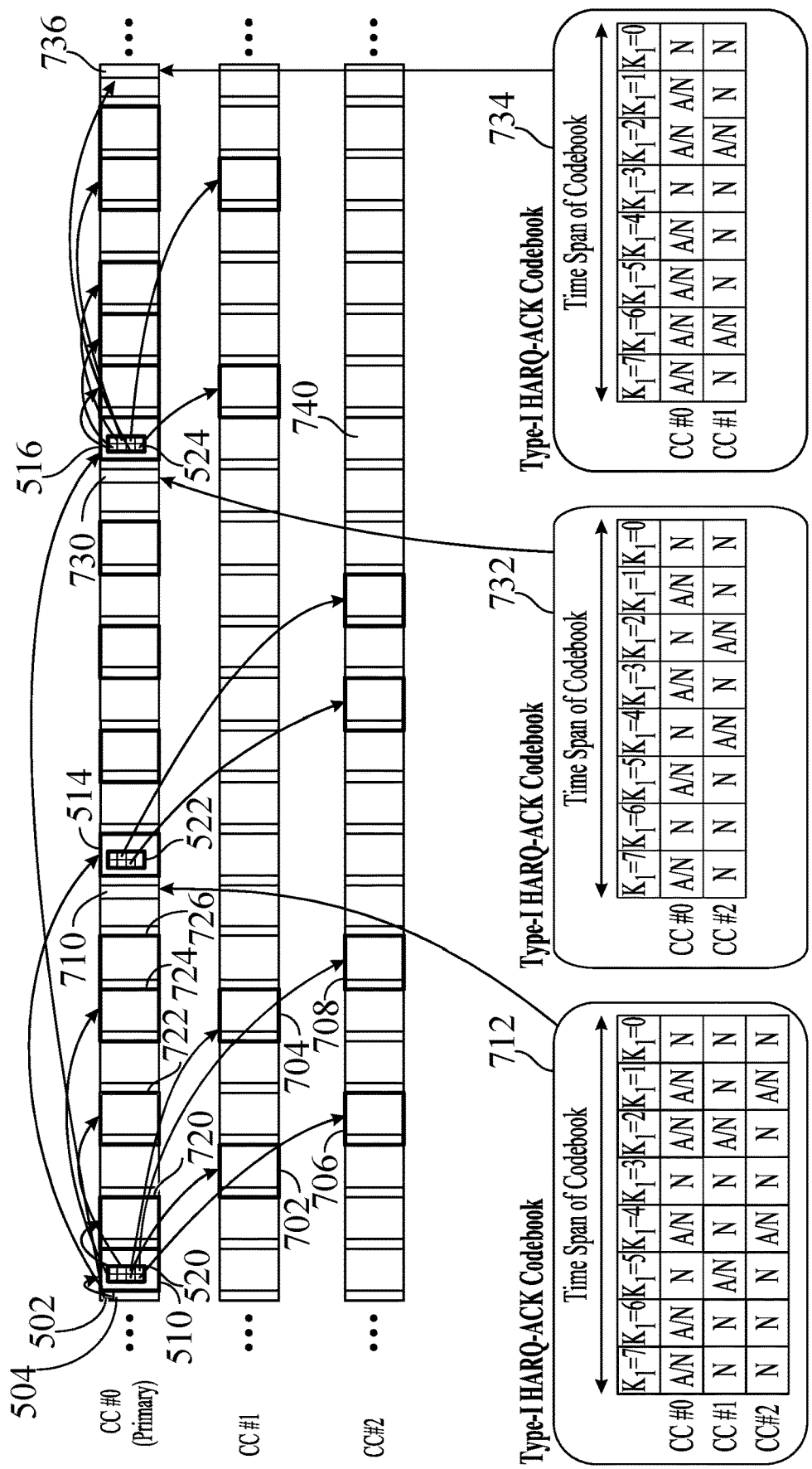
FIG. 7 illustrates piggybacked DCIs allocating PDSCH resources for carrier aggregation (CA), in accordance with certain aspects of the present disclosure.

FIG. 7 illustrates piggybacked DCIs allocating PDSCH resources for carrier aggregation (CA), in accordance with certain aspects of the present disclosure. As illustrated, the piggybacked DCIs in resources 520 on a component carrier (e.g., CC #0) may indicate resources allocated for PDSCHs (e.g., PDSCHs on different component carriers (e.g., CC #1 and CC #2)). For example, the piggybacked DCIs may indicate resources allocated for PDSCHs 702, 704 on CC #1, and PDSCHs 706, 708 on CC #2.

As illustrated, a physical uplink control channel (PUCCH) 710 may be transmitted by the UE having a hybrid automatic repeat request (HARQ) acknowledgement (ACK) codebook 712. As illustrated, the codebook 712 indicates ACK or negative ACK (NACK) (A/N) for PDSCHs 510, 702, 704, 706, 708, 720, 722, 724, 726 assigned to the UE, as illustrated. For example, for $K_1$ (PDSCH to HARQ timing indicator)=1 in codebook 712, the UE indicates A/N for PDSCHs 726, 708, and for $K_1$=2 in codebook 712, the UE indicates A/N for PDSCHs 724, 704, and so on.

In some cases, the piggybacked DCIs may indicate resources allocated for PDSCHs on a subset of configured CCs. For example, the piggybacked DCIs in the resources 522 may indicate resources allocated for PDSCHs on CC #0 and CC #2 without any resources on CC #1. Therefore, based on the piggybacked DCIs, the UE may not monitor CC #1, resulting in UE power saving, and may not feedback HARQ A/N for CC #1 via codebook 732 in PUCCH 730 (reducing signaling overhead). Similarly, the piggybacked DCIs in the resources 524 may indicate resources allocated for PDSCHs on CC #0 and CC #1 without any resources on CC #2. Therefore, based on the piggybacked DCIs, the UE may not monitor CC #2, resulting in UE power saving, and may not feedback HARQ A/N for CC #2 via codebook 734 in PUCCH 736.

Certain aspects of the present disclosure, the PDSCH 740 may be allocated using piggybacked DCIs, or DCI in a PDCCH. For example, the PDSCH 740 may be in the same slot as the PDSCH 516 and may be assigned semi-statically by an SPS activation DCI (e.g., DCI 502) in a CORESET (e.g., PDCCH 504) of CC #0. As another example, the PDSCH 740 may be assigned dynamically by DCI (e.g., a piggybacked DCI in resources 524) on the SPS PDSCH 516 by setting a parameter $K_0=0$.

Figure 8:
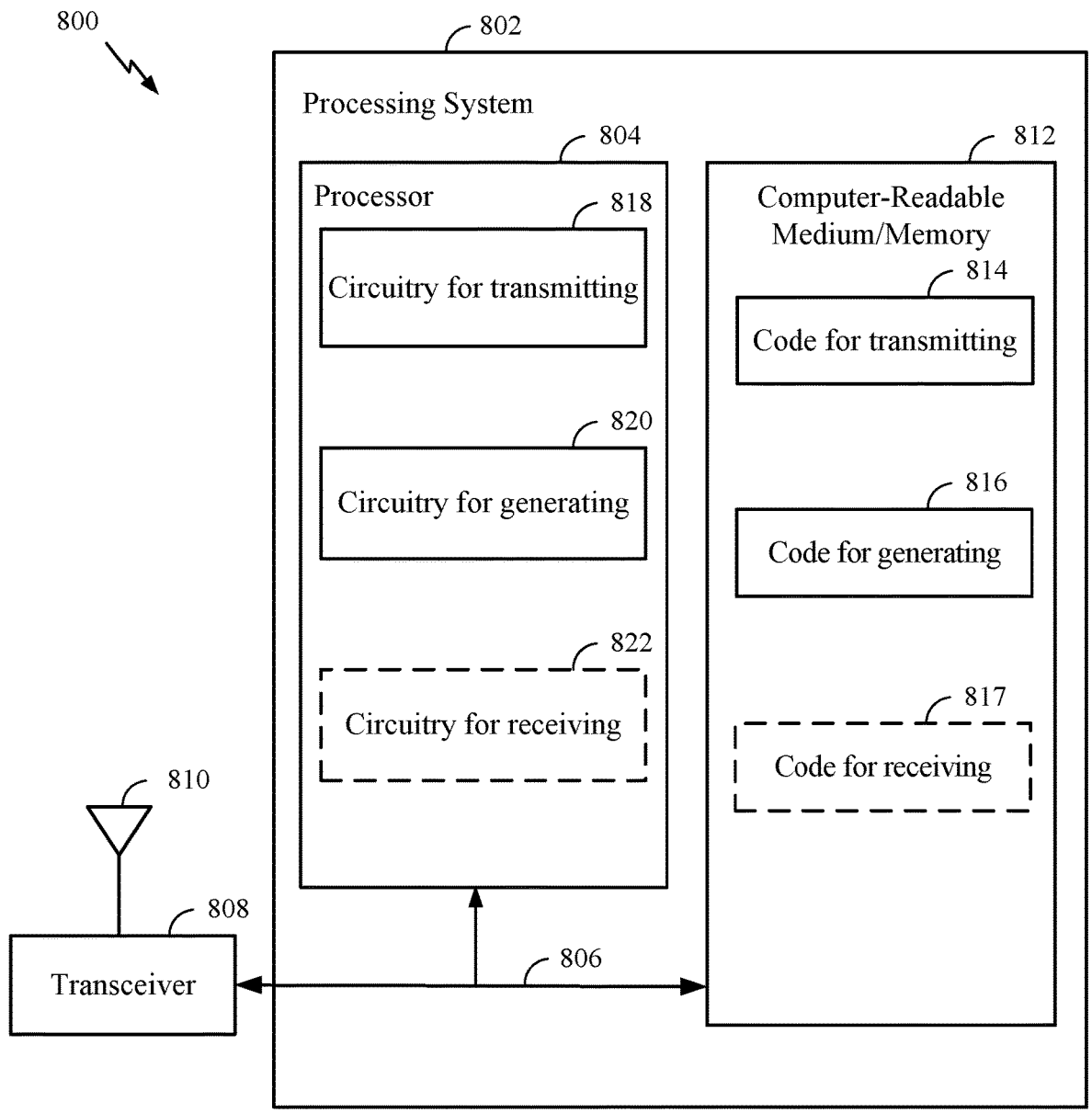
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 3. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 3, or other operations for performing the various techniques discussed herein for transmission of DCI piggybacked on SPS PDSCH. In certain aspects, computer-readable medium/memory 812 stores code 814 for (e.g., an example of means for) transmitting; and code 816 for (e.g., an example of means for) generating. The computer-readable medium/memory 812 may also, optionally, store code 817 for receiving (e.g., receiving an ACK/NACK message).

In certain aspects, the processor 804 has circuitry configured to implement the code stored in the computer-readable medium/memory 812. The processor 804 includes circuitry 818 for (e.g., an example of means for) transmitting; and circuitry 820 for (e.g., an example of means for) generating. The processor 804 may also include, optionally, circuit for receiving (e.g., receiving an ACK/NACK message).

One or more of code 814, 816 may be executed by a general-purpose processor, a digital signal processor (DSP), an application-specific integrated circuit (ASIC), a field programmable gate array (FPGA) or other programmable logic device. In certain aspects, computer-readable medium/memory 812 is an example of a control signaling manager 241. One or more of circuitry 818, 820 may be implemented by one or more of a general-purpose processor, a DSP, an ASIC, a FPGA or other programmable logic device. In certain aspects, processor 804 is an example of a control signaling manager 241.

The transceiver 808 may provide a means for receiving information such as packets, user data, or control information associated with various information channels (e.g., control channels, data channels, and information related to power saving of smart repeaters based on a triggering signal, etc.). Information may be passed on to other components of the device 800. The transceiver 808 may be an example of aspects of the antenna 234 described with reference to FIG. 2. The antenna 810 may correspond to a single antenna or a set of antennas. The transceiver 808 may provide means for transmitting signals generated by other components of the device 800.

Figure 9:
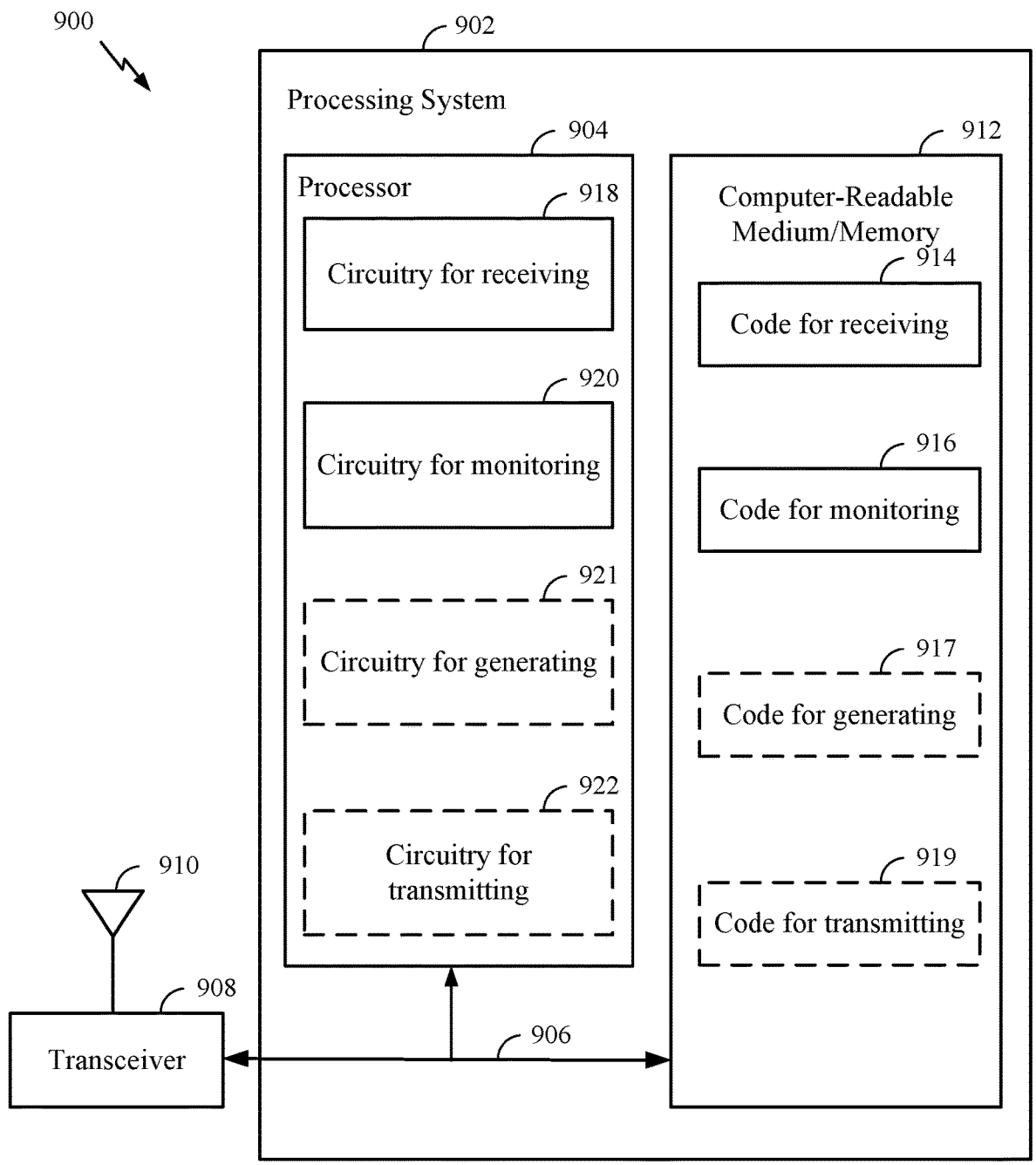
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 4. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 4, or other operations for performing the various techniques discussed herein for transmission of DCI piggybacked on SPS PDSCH. In certain aspects, computer-readable medium/memory 912 stores code 914 for (e.g., an example of means for) receiving (e.g., receiving a message or an indication); and code 916 for (e.g., an example of means for) monitoring (e.g., for data). The computer-readable medium/memory 912 stores may also, optionally, store code 917 for generating (e.g., generating an ACK/NACK message, and circuitry 919 for transmitting (e.g., transmitting the ACK/NACK).

In certain aspects, the processor 904 has circuitry configured to implement the code stored in the computer-readable medium/memory 912. The processor 904 includes circuitry 918 for (e.g., an example of means for) receiving (e.g., receiving a message or an indication); and code 920 for (e.g., an example of means for) monitoring (e.g., for data). The processor 904 may also include, optionally, circuitry 921 for generating (e.g., generating an ACK/NACK message, and circuitry 922 for transmitting (e.g., transmitting the ACK/NACK).

The transceiver 908 may provide a means for receiving information such as packets, user data, or control information associated with various information channels (e.g., control channels, data channels, and information related to power saving of smart repeaters based on a triggering signal, etc.). Information may be passed on to other components of the device 900. The transceiver 908 may be an example of aspects of the transceiver 254 described with reference to FIG. 2. The antenna 910 may correspond to a single antenna or a set of antennas. The transceiver 908 may provide means for transmitting signals generated by other components of the device 900.

The control signaling managers 241, 281 may support wireless communication in accordance with examples as disclosed herein.

The control signaling managers 241, 281 may be an example of means for performing various aspects described herein. The control signaling managers 241, 281, or their sub-components, may be implemented in hardware (e.g., in control signaling management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the control signaling managers 241, 281, or their sub-components, may be implemented in code (e.g., as control signaling management software or firmware) executed by a processor, or any combination thereof. If implemented in code executed by a processor, the functions of the control signaling managers 241, 281, or their sub-components may be executed by a general-purpose processor, a DSP, an ASIC, a FPGA, or other programmable logic device.

In some examples, the control signaling managers 241, 281 may be configured to perform various operations (e.g., receiving, transmitting, monitoring, generating) using or otherwise in cooperation with the transceivers 808 and/or 908.

The control signaling managers 241, 281, or their sub-components, may be physically located at various positions, including being distributed such that portions of functions are implemented at different physical locations by one or more physical components. In some examples, the control signaling managers 241, 281, or their sub-components, may be a separate and distinct component in accordance with various aspects of the present disclosure. In some examples, control signaling managers 241, 281, or their sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Aspects

Aspect 1. A method for wireless communication, comprising: receiving a message having a configuration for semi persistent scheduling (SPS) of data channels; receiving an indication associated with at least one first downlink control information (DCI) for transmission in at least one of the data channels; and monitoring for the data channels in accordance with the configuration for SPS.

Aspect 2. The method of aspect 1, further comprising receiving the at least one of the data channels, the at least one of the data channels comprising the at least one first DCI.

Aspect 3. The method of any one of aspects 1-2, wherein the message comprises the indication associated with at least one first downlink control information (DCI).

Aspect 4. The method of any one of aspects 1-3, wherein the data channels comprise SPS data in accordance with the configuration.

Aspect 5. The method of any one of aspects 1-4, wherein the configuration associated with the at least one first DCI comprises at least one of a resource allocation for the at least one first DCI, a quantity of the at least one first DCI, or a modulation and coding scheme (MCS) associated with the at least one first DCI, or any combination thereof.

Aspect 6. The method of any one of aspects 1-5, wherein the configuration associated with the at least one first DCI comprises a maximum size of resources allocated for reception of the at least one first DCI.

Aspect 7. The method of any one of aspects 1-6, further comprising: receiving second DCI on a control channel, wherein the second DCI activates the configuration for the SPS of the data channels.

Aspect 8. The method of aspect 7, wherein the second DCI, the message, or a combination thereof, indicates the configuration associated with the at least one first DCI.

Aspect 9. The method of any one of aspects 7-8, wherein the message having the configuration for the SPS of the data channels indicates a plurality of configuration candidates associated with the at least one first DCI, and wherein the second DCI indicates an index associated with one of the plurality of configuration candidates.

Aspect 10. The method of any one of aspects 7-9, wherein the message having the configuration for the SPS of the data channels indicates resources for transmission of the at least one first DCI, and wherein the second DCI indicates whether the at least one first DCI is to be transmitted via the resources.

Aspect 11. The method of any one of aspects 7-10, wherein the second DCI is on a first component carrier (CC), and wherein the second DCI indicates resources for one of the data channels on a second CC, the second DCI being in the same slot as the one of the data channels.

Aspect 12. The method of any one of aspects 1-11, wherein the data channels are configured via the message for a first type of data, and wherein at least one of the data channels are generated without the first type of data.

Aspect 13. The method of aspect 12, wherein the data channels comprise a second type of data, the second type of data being different than the first type of data.

Aspect 14. The method of any one of aspects 1-13, further comprising receiving the at least one of the data channels comprising the at least one first DCI, wherein the at least one first DCI indicates resources allocated for reception of a control channel.

Aspect 15. The method of any one of aspects 1-14, further comprising receiving the at least one of the data channels comprising the at least one first DCI, wherein the at least one first DCI indicates resources for reception of at least one second DCI in one or more of the data channels.

Aspect 16. The method of any one of aspects 1-15, further comprising receiving the at least one of the data channels comprising the at least one first DCI, wherein the at least one first DCI indicates resources allocated for at least one other data channel, the method further comprising receiving the at least one other data channel via the resources indicated by the at least one first DCI.

Aspect 17. The method of any one of aspects 1-16, wherein the at least one first DCI is received via a first CC, and wherein one or more of the data channels is received via a second CC.

Aspect 18. The method of any one of aspects 1-17, wherein the message configures a plurality of component carriers (CCs), and wherein the at least one first DCI allocates resources in only a portion of the plurality of CCs, the method further comprising: generating an acknowledgement or negative acknowledgement (ACK/NACK) message indicating ACK/NACK for the portion of the plurality CCs without indicating ACK/NACK for another portion of the plurality of CCs; and transmitting the ACK/NACK message.

Aspect 19. The method of any one of aspects 1-18, wherein the message configures a plurality of component carriers (CCs), and wherein the at least one first DCI allocates resources in only a portion of the plurality of CCs, the method further comprising forgoing monitoring another portion of the plurality CCs.

Aspect 20. The method of any one of aspects 1-19, wherein the at least one first DCI is on one of the data channels on a first CC, and wherein the at least one first DCI indicates resources for another one of data channels on a second CC, the one of the data channels being in the same slot as the other one of the data channels.

Aspect 21. A method for wireless communication, comprising: transmitting a message having a configuration for semi persistent scheduling (SPS) of data channels; transmitting an indication associated with at least one first downlink control information (DCI) for transmission in at least one of the data channels; generating the data channels in accordance with the configuration for SPS; and transmitting the at least one of the data channels.

Aspect 22. The method of aspect 21, wherein the at least one of the data channels comprising the at least one first DCI.

Aspect 23. The method of any one of aspects 21-22, wherein the message comprises a radio resource control (RRC) message.

Aspect 24. The method of any one of aspects 21-23, wherein the data channels comprise SPS data in accordance with the configuration.

Aspect 25. The method of any one of aspects 21-24, wherein the configuration associated with the at least one first DCI comprises at least one of a resource allocation for the at least one first DCI, a quantity of the at least one first DCI, or a modulation and coding scheme (MCS) associated with the at least one first DCI, or any combination thereof.

Aspect 26. The method of any one of aspects 21-25, wherein the configuration associated with the at least one first DCI comprises a maximum size of resources allocated for reception of the at least one first DCI.

Aspect 27. The method of any one of aspects 21-26, further comprising: transmitting second DCI on a control channel, wherein the second DCI activates the configuration for the SPS of the data channels.

Aspect 28. The method of aspect 27, wherein the second DCI, the message, or a combination thereof, indicates the configuration associated with the at least one first DCI.

Aspect 29. The method of any one of aspects 27-28, wherein the message having the configuration for the SPS of the data channels indicates a plurality of configuration candidates associated with the at least one first DCI, and wherein the second DCI indicates an index associated with one of the plurality of configuration candidates.

Aspect 30. The method of any one of aspects 27-29, wherein the message having the configuration for the SPS of the data channels indicates resources for transmission of the at least one first DCI, and wherein the second DCI indicates whether the at least one first DCI is to be transmitted via the resources.

Aspect 31. The method of any one of aspects 27-30, wherein the second DCI is on a first component carrier (CC), and wherein the second DCI indicates resources for one of the data channels on a second CC, the second DCI being in the same slot as the one of the data channels.

Aspect 32. The method of any one of aspects 21-31, wherein the data channels are configured via the message for a first type of data, and wherein at least one of the data channels are generated without the first type of data.

Aspect 33. The method of aspect 32, wherein the data channels comprise a second type of data, the second type of data being different than the first type of data.

Aspect 34. The method of any one of aspects 21-33, wherein the at least one of the data channels comprises the at least one first DCI, wherein the at least one first DCI indicates resources allocated for reception of a control channel.

Aspect 35. The method of any one of aspects 21-34, wherein the at least one of the data channels comprises the at least one first DCI, wherein the at least one first DCI indicates resources for reception of at least one second DCI in one or more of the data channels.

Aspect 36. The method of any one of aspects 21-35, wherein the at least one of the data channels comprises the at least one first DCI, wherein the at least one first DCI indicates resources allocated for at least one other data channel, the method further comprising transmitting the at least one other data channel via the resources indicated by the at least one first DCI.

Aspect 37. The method of any one of aspects 21-36, wherein the at least one first DCI is transmitted via a first CC, and wherein one or more of the data channels is transmitted via a second CC.

Aspect 38. The method of any one of aspects 21-37, wherein the message configures a plurality of component carriers (CCs), and wherein the at least one first DCI allocates resources in only a portion of the plurality of CCs, the method further comprising receiving an acknowledgement or negative acknowledgement (ACK/NACK) message indicating ACK/NACK for the portion of the plurality CCs without indicating ACK/NACK for another portion of the plurality of CCs.

Aspect 39. The method of any one of aspects 21-38, wherein the at least one first DCI is on one of the data channels on a first CC, and wherein the at least one first DCI indicates resources for another one of data channels on a second CC, the one of the data channels being in the same slot as the other one of the data channels.

Aspect 40. An apparatus comprising means for performing the method of any of aspects 1 through 39.

Aspect 41. An apparatus comprising at least one processor and a memory coupled to the at least one processor, the memory comprising code executable by the at least one processor to cause the apparatus to perform the method of any of aspects 1 through 39.

Aspect 42. A computer readable medium storing computer executable code thereon for wireless communications that, when executed by at least one processor, cause an apparatus to perform the method of any of aspects 1 through 39.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured.

MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method for wireless communication, comprising:
    receiving a message including a semi persistent scheduling (SPS) configuration for SPS-configured data channels;
    receiving an indication associated with at least one first downlink control information (DCI) to be transmitted in at least one SPS-configured data channel of the SPS-configured data channels, wherein the indication comprises at least one of:
        a resource allocation for the at least one first DCI in the at least one SPS-configured data channels; or
        a quantity of the at least one first DCI to be transmitted in the at least one SPS-configured data channel; and
    monitoring for the SPS-configured data channels in accordance with the SPS configuration.

2. The method of claim 1, further comprising receiving the at least one of the SPS-configured data channels, the at least one of the SPS-configured data channels comprising the at least one first DCI.

3. The method of claim 1, wherein the message comprises the indication associated with at least one first DCI.

4. The method of claim 1, wherein the indication associated with the at least one first DCI further comprises a modulation and coding scheme (MCS) associated with the at least one first DCI.

5. The method of claim 1, wherein the indication associated with the at least one first DCI comprises a maximum size of resources allocated for reception of the at least one first DCI.

6. The method of claim 1, further comprising:
receiving second DCI on a control channel, wherein the second DCI activates the SP configuration for the SPS data channels.

7. The method of claim 6, wherein the second DCI, the message, or a combination thereof, indicates the indication associated with the at least one first DCI.

8. The method of claim 6, wherein the message including the SPS configuration for the SPS data channels indicates a plurality of configuration candidates associated with the at least one first DCI, and wherein the second DCI indicates an index associated with one of the plurality of configuration candidates.

9. The method of claim 6, wherein the message including the SPS configuration for the SPS data channels indicates resources for transmission of the at least one first DCI, and wherein the second DCI indicates whether the at least one first DCI is to be transmitted via the resources.

10. The method of claim 6, wherein the second DCI is on a first component carrier (CC), and wherein the second DCI indicates resources for one of the SPS-configured data channels on a second CC, the second DCI being in a same slot as the one of the SPS-configured data channels.

11. The method of claim 1, further comprising receiving the at least one of the SPS-configured data channels comprising the at least one first DCI, wherein the at least one first DCI indicates resources allocated for reception of a control channel.

12. The method of claim 1, further comprising receiving the at least one of the SPS-configured data channels comprising the at least one first DCI, wherein the at least one first DCI indicates resources for reception of at least one second DCI in one or more of the SPS-configured data channels.

13. The method of claim 1, further comprising receiving the at least one of the SPS-configured data channels comprising the at least one first DCI, wherein the at least one first DCI indicates resources allocated for at least one other data channel, the method further comprising receiving the at least one other data channel via the resources indicated by the at least one first DCI.

14. The method of claim 1, wherein the message configures a plurality of component carriers (CCs), and wherein the at least one first DCI allocates resources in only a portion of the plurality of CCs, the method further comprising:
generating an acknowledgement or negative acknowledgement (ACK/NACK) message indicating ACK/NACK for the portion of the plurality CCs without indicating ACK/NACK for another portion of the plurality of CCs; and
transmitting the ACK/NACK message.

15. The method of claim 1, wherein the message configures a plurality of component carriers (CCs), and wherein the at least one first DCI allocates resources in only a portion of the plurality of CCs, the method further comprising forgoing monitoring another portion of the plurality CCs.

16. The method of claim 1, wherein the at least one first DCI is on one of the SPS-configured data channels on a first CC, and wherein the at least one first DCI indicates resources for another one of SPS-configured data channels on a second CC, the one of the SPS-configured data channels being in a same slot as the other one of the SPS-configured data channels.

17. A method for wireless communication, comprising:
transmitting a message including a semi persistent scheduling (SPS) configuration for SPS-configured data channels;
transmitting an indication associated with at least one first downlink control information (DCI) to be transmitted in at least one of the SPS-configured data channels, wherein the indication comprises at least one of:
a resource allocation for the at least one first DCI in the at least one SPS-configured data channels; or
a quantity of the at least one first DCI to be transmitted in the at least one SPS-configured data channel;
generating the at least one of the SPS-configured data channels in accordance with the SPS configuration; and
transmitting the at least one of the SPS-configured data channels.

18. The method of claim 17, wherein the at least one of the SPS-configured data channels comprises the at least one first DCI.

19. The method of claim 17, wherein the indication associated with the at least one first DCI further comprises a modulation and coding scheme (MCS) associated with the at least one first DCI.

20. The method of claim 17, wherein the indication associated with the at least one first DCI comprises a maximum size of resources allocated for reception of the at least one first DCI.

21. The method of claim 17, further comprising:
transmitting second DCI on a control channel, wherein the second DCI activates the SPS configuration for the SPS data channels.

22. The method of claim 21, wherein the message including the SPS configuration for the SPS data channels indicates a plurality of configuration candidates associated with the at least one first DCI, and wherein the second DCI indicates an index associated with one of the plurality of configuration candidates.

23. The method of claim 21, wherein the message including the SPS configuration for the SPS data channels resources for transmission of the at least one first DCI, and wherein the second DCI indicates whether the at least one first DCI is to be transmitted via the resources.

24. The method of claim 17, wherein the at least one of the SPS-configured data channels comprises the at least one first DCI, wherein the at least one first DCI indicates resources allocated for reception of a control channel.

25. The method of claim 17, wherein the at least one of the SPS-configured data channels comprises the at least one first DCI, wherein the at least one first DCI indicates resources for reception of at least one second DCI in one or more of the SPS-configured data channels.

26. The method of claim 17, wherein the at least one of the SPS-configured data channels comprises the at least one first DCI, wherein the at least one first DCI indicates resources allocated for at least one other data channel, the method further comprising transmitting the at least one other data channel via the resources indicated by the at least one first DCI.

27. The method of claim 17, wherein the message configures a plurality of component carriers (CCs), and wherein the at least one first DCI allocates resources in only a portion of the plurality of CCs, the method further comprising receiving an acknowledgement or negative acknowledgement (ACK/NACK) message indicating ACK/NACK for the portion of the plurality CCs without indicating ACK/NACK for another portion of the plurality of CCs.

28. The method of claim 17, wherein the at least one first DCI is on one of the SPS-configured data channels on a first CC, and wherein the at least one first DCI indicates resources for another one of SPS-configured data channels on a second CC, the one of the SPS-configured data channels being in a same slot as the other one of the SPS-configured data channels.

29. An apparatus for wireless communications, comprising:
   a memory; and
   at least one processor coupled to the memory, the at least one processor being configured to:
      receive a message including a semi persistent scheduling (SPS) configuration for SPS-configured data channels;
      receive an indication associated with at least one first downlink control information (DCI) to be transmitted in at least one of the SPS-configured data channels, wherein the indication comprises at least one of:
         a resource allocation for the at least one first DCI in the at least one SPS-configured data channels; or
         a quantity of the at least one first DCI to be transmitted in the at least one SPS-configured data channel; and
      monitor for the data channels in accordance with the SPS configuration.

30. An apparatus for wireless communications, comprising:
   a memory; and
   at least one processor coupled to the memory, the at least one processor being configured to:
      transmit a message including a semi persistent scheduling (SPS) configuration for SPS-configured data channels;
      transmit an indication associated with at least one first downlink control information (DCI) to be transmitted in at least one of the data channels, wherein the indication comprises at least one of:
         a resource allocation for the at least one first DCI in the at least one SPS-configured data channels; or
         a quantity of the at least one first DCI to be transmitted in the at least one SPS-configured data channel;
      generate the at least one of the SPS-configured data channels in accordance with the SPS configuration; and
      transmit the at least one of the SPS-configured data channels.

* * * * *